United States Patent [19] [11] 4,349,292

Albert, Jr. [45] Sep. 14, 1982

[54] IN-FLIGHT HYDROPHONE DEPLOYMENT SYSTEM FOR UNDERWATER VEHICLES

[75] Inventor: Orrin W. Albert, Jr., Escondido, Calif.

[73] Assignee: The United States of America as represented by the Secretary of the Navy, Washington, D.C.

[21] Appl. No.: 240,729

[22] Filed: Mar. 5, 1981

Related U.S. Application Data

[62] Division of Ser. No. 113,917, Jan. 21, 1980, Pat. No. 4,283,731.

[51] Int. Cl.[3] ........................ B25G 3/18; F16B 21/00; F16D 1/00

[52] U.S. Cl. .................................... 403/322; 367/130; 114/20 R; 114/244

[58] Field of Search ............... 403/316, 321, 322, 324, 403/325; 367/106, 130, 131, 133, 173; 114/20 R, 244, 254

[56] References Cited

U.S. PATENT DOCUMENTS 3,276,799 10/1966 Moore et al. ........................ 403/316
3,509,515 4/1970 Acord ............................. 403/325 X
3,727,958 4/1973 Peters ............................. 403/316 X
4,300,937 11/1981 Byrne et al. .................... 403/316 X

*Primary Examiner*—Wayne L. Shedd
*Attorney, Agent, or Firm*—Robert F. Beers; Ervin F. Johnston; Thomas G. Keough

[57] ABSTRACT

A hydrophone deployment apparatus is provided for an underwater vehicle, wherein the apparatus includes an annular drum releasably mounted about the tail portion of the vehicle. A plurality of arms are pivotally connected to the aft portion of the drum and are capable of swinging from forward positions flush with the vehicle to aft positions behind the drum. A device is provided for enabling retention and selective releasing of the arms from the forward flush positions. A hydrophone is releasably mounted on the inside of one of the arms, and a cable is connected between the hydrophone and the vehicle with an intermediate portion wound on the drum. With this arrangement a release of the arms during travel of the vehicle will cause the drum to be released and the vehicle will swim away from the drum pulling the cable until it is completely off the drum, at which time the hydrophone is pulled from its mounting in the arm. At this time the drum is jettisoned and the hydrophone becomes operational.

2 Claims, 13 Drawing Figures

IN-FLIGHT HYDROPHONE DEPLOYMENT SYSTEM FOR UNDERWATER VEHICLES

STATEMENT OF GOVERNMENT INTEREST

The invention described herein may be manufactured and used by or for the Government of the United States of America for governmental purposes without the payment of any royalties thereon or therefor.

This is a division of application Ser. No. 113,917, filed Jan. 21, 1980, now U.S. Pat. No. 4,283,731.

BACKGROUND OF THE INVENTION

Hydrophones are commonly employed as underwater listening devices. In most instances these hydrophones are stationary, and the acoustic signals sensed by the hydrophones are communicated to a receiving module where they may be processed or telemetered to still another receiving station. Hydrophones may also be mounted upon a vehicle and moved around to obtain acoustic signals at various locations in the ocean. Whenever a hydrophone is attached to a vehicle, there is always the problem of the vehicle's self noise which is imposed on the listening hydrophone. One method of minimizing this problem is to deploy the hydrophone via a tethered cable to some location aft of the vehicle. While this arrangement works quite satisfactorily in minimizing vehicle noise, a serious problem accrues in deploying the cable without entanglement with itself or about portions of the vehicle. In one prior art embodiment where a torpedo shaped vehicle was utilized, the cable was wrapped directly around a steering control shroud ring at the aft end of the vehicle. This arrangement frequently resulted in entanglement of the cable and a loss of the function of the hydrophone.

SUMMARY OF THE INVENTION

The present invention provides a unique hydrophone deployment apparatus which can be utilized with a torpedo-shaped underwater vehicle. The apparatus may include an annular drum which is releasably mounted about the tail portion of the vehicle. A plurality of arms are pivotally connected to the aft portion of the drum and are capable of swinging from forward positions flush with the vehicle to aft positions behind the drum. A device is provided which enables retention and selective releasing of the arms from the forward flush positions. A hydrophone is releasably mounted on the inside of one of the arms, and a cable is connected between the hydrophone and the vehicle with an intermediate portion wound on the drum. With this arrangement a release of the arms during motion of the vehicle causes the drum to be released and the vehicle swims away pulling the cable from the drum. When all of the cable is pulled from the drum, the hydrophone is pulled from its mounting in the arm and the drum is jettisoned to make the hydrophone operational.

OBJECTS OF THE INVENTION

An object of the present invention is to provide an improved hydrophone deployment apparatus for an underwater vehicle.

Another object is to provide an apparatus which will deploy a hydrophone from a moving underwater vehicle without entanglement of cabling between the hydrophone and the vehicle.

A further object is to provide a hydrophone and cable deployment apparatus which is mountable on the aft end of a torpedo-shaped underwater vehicle, and which can be released to pay out the hydrophone and cable behind the vehicle as the vehicle moves in the water, without entanglement of the cable.

Still another object is to provide a low cost and efficient hydrophone and cable deployment apparatus for a torpedo-shaped underwater vehicle which will protect the aft end of the vehicle, and yet upon deployment will substantially linearly deploy the hydrophone and cabling aft of the vehicle without entanglement of the cable upon itself or upon the vehicle.

These and other objects of the invention will become more readily apparent from the ensuing specification when taken together with the drawings.

DESCRIPTION OF THE PREFERRED EMBODIMENT

Figure 1:
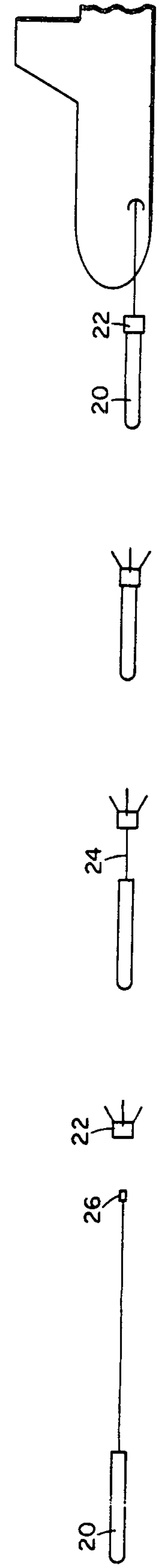
FIG. 1 is an ocean elevational view of a submarine firing a torpedo-like vehicle which is carrying the present invention for deploying a hydrophone.

Referring now to the drawings wherein like reference numerals designate like or similar parts throughout the several views there is illustrated in FIG. 1 a submarine which has fired a torpedo-shaped underwater vehicle 20. A hydrophone deployment apparatus 22 is mounted on the tail portion of the vehicle. Soon after firing of the vehicle the deployment apparatus is released from the vehicle to pay out a cable 24 which is connected between the vehicle 20 and a hydrophone 26. After the cable 24 is completely payed out, the hydrophone 26 is released from the deployment apparatus 22 and the deployment apparatus is then jettisoned into the ambient water. With the unique arrangement of the deployment apparatus 22, the hydrophone 26 is ensured of deployment aft of the underwater vehicle without any entanglement of the connecting cable 24. This hydrophone deployment apparatus 22 will be described in detail hereinbelow.

Figure 2:
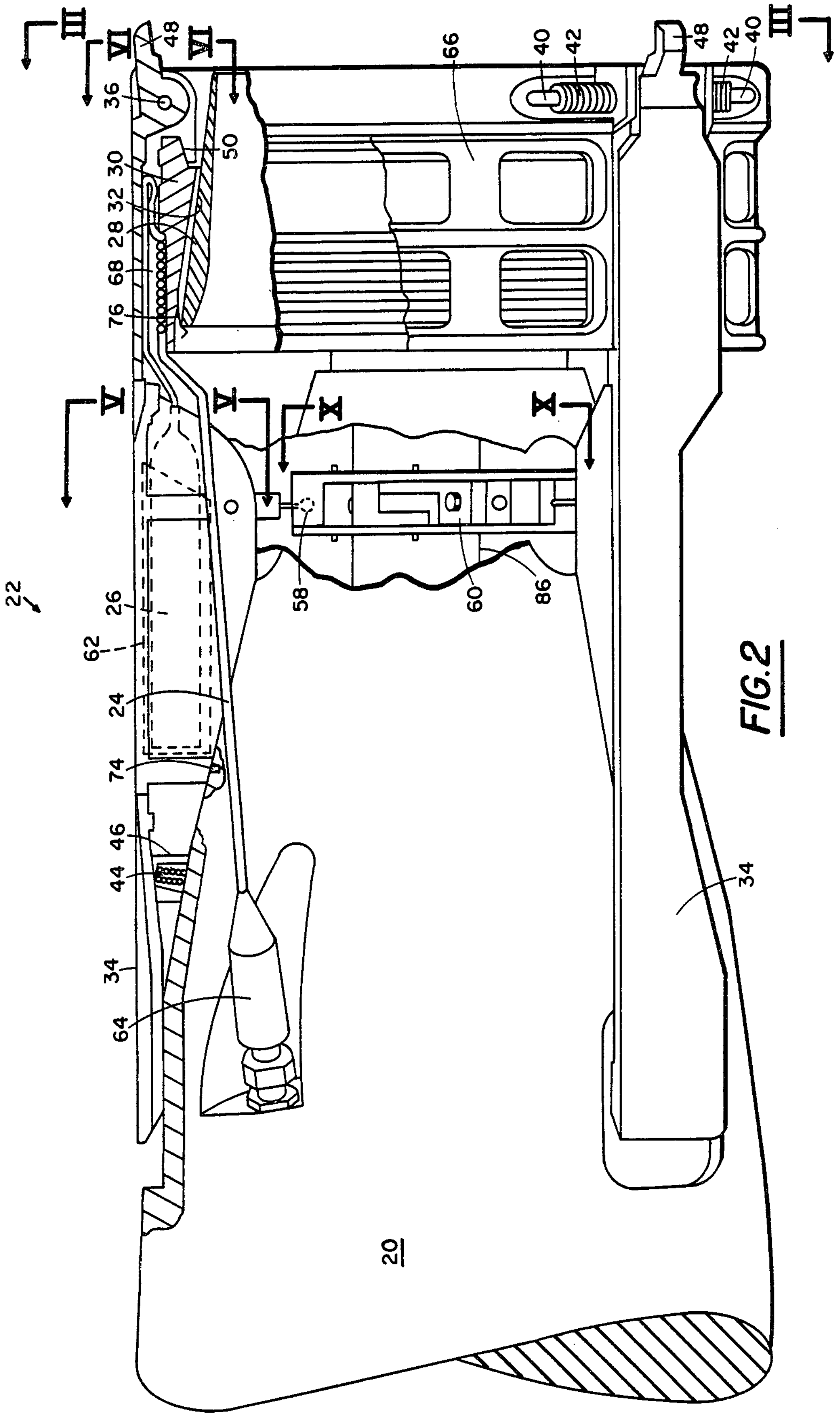
FIG. 2 is a side view of the hydrophone deployment apparatus and the aft end of a torpedo-shaped underwater vehicle with portions shown in cross section and with the deployment apparatus shown in a retained condition.

As illustrated in FIG. 2, the hydrophone deployment apparatus 22 is mounted on the aft end of the vehicle 20. The underwater vehicle has a tapered tail portion, and has a movable tapered ring-like shroud 28 at its extreme aft end for steering the vehicle 20 through the water. The hydrophone deployment apparatus 22 includes an annular drum 30 which is releasably mounted about the tail portion and more particularly about the shroud 28 of the underwater vehicle. The drum 30 may be provided with circumferentially spaced rubber pads 32 for making a soft engagement with the vehicle shroud 28.

Figure 6:
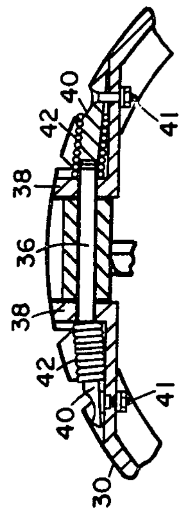
FIG. 6 is a cross-sectional view taken along plane VI—VI of FIG. 2.
Figure 3:
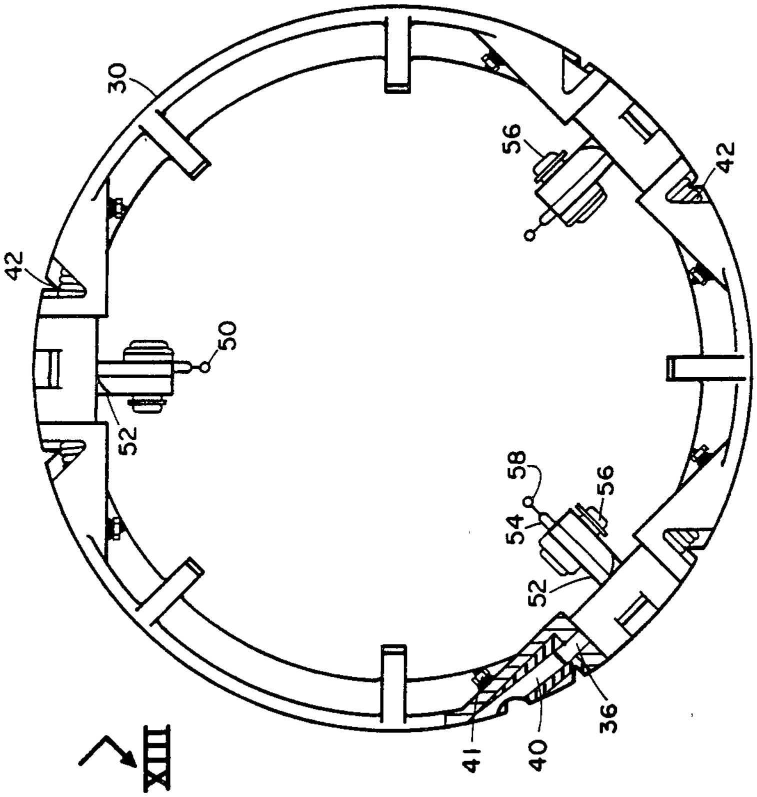
FIG. 3 is a view taken along plane III—III of FIG. 2 with the underwater vehicle removed therefrom.
Figure 4:
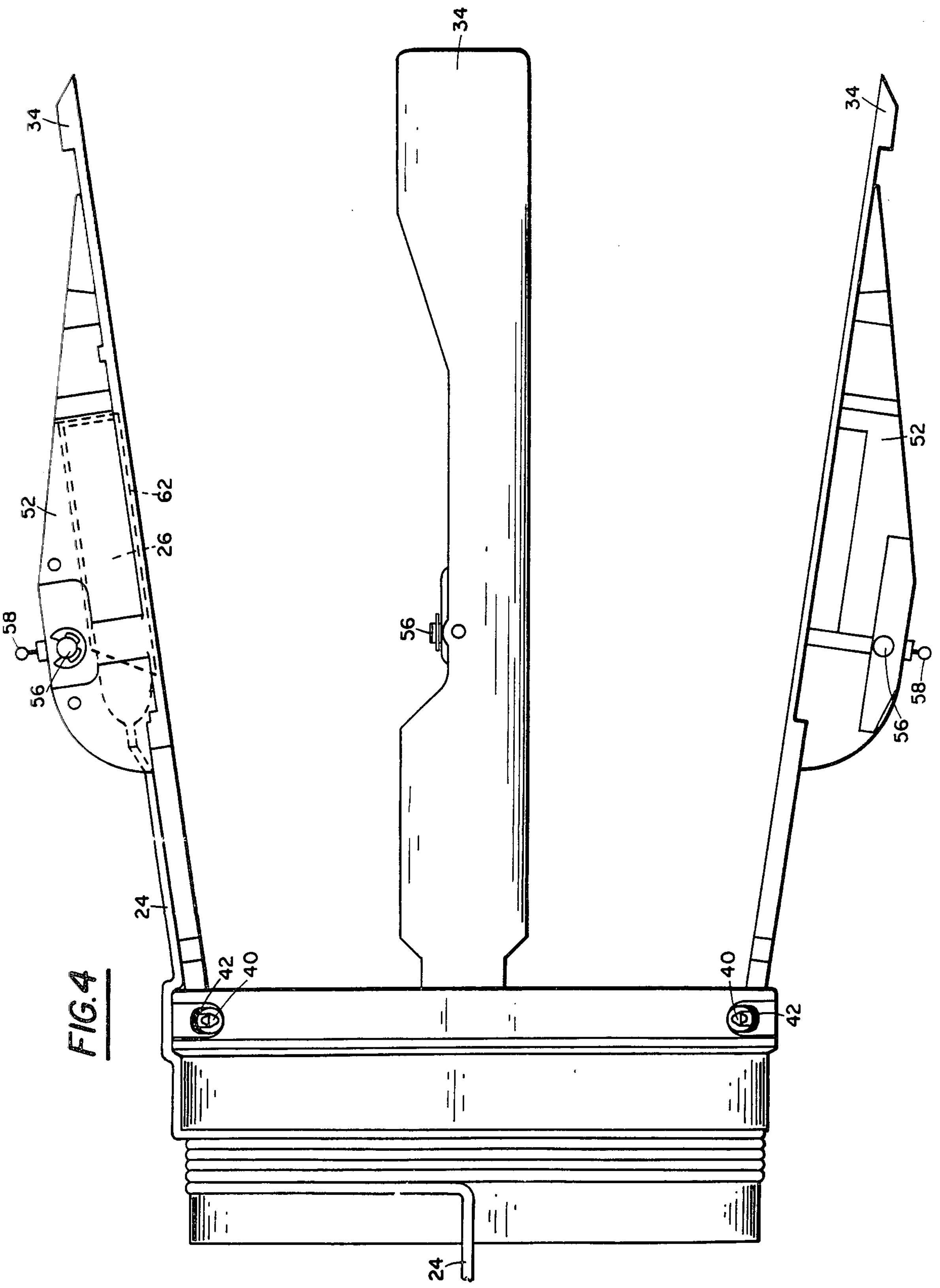
FIG. 4 is a view similar to FIG. 2 except the hydrophone deployment apparatus is shown in a released condition from the underwater vehicle.

A plurality of arms 34 are pivotally connected at 36 to an aft portion of the drum 30. The arms 34 are capable of swinging from forward positions flush with the vehicle 20, as illustrated in FIG. 2, to aft positions behind the drum 30, as illustrated in FIG. 4. When the arms are in their forward positions, the entire hydrophone deployment apparatus 22 is substantially coextensive with the cylindrical shape of the vehicle 20. With this arrangement the deployment apparatus minimizes hydrodynamic deterioration of the vehicle configuration. As illustrated in FIGS. 2, 3, and 6, the pivotal connection of each arm to the drum may include a pin 36, which extends through a respective end of the arm, thence through opposing flanges 38 on the drum, and is secured to each end by anchor bars 40. The anchor bars are fastened to the drum by bolt and nut combinations 41. Torsion springs 42 may be mounted on each anchor bar 40 on each side of the respective drum flange 38 for biasing the respective arms to the outward open positions, as illustrated in FIG. 4. A quick opening of the arms from the closed positions, as illustrated in FIG. 2, is important so that the arms will clear the steering shroud 28 during aft movement of the drum 30. In order to further aid in this process a compression spring 44 is mounted between each arm 34 and the vehicle 20 for biasing the respective arm away from the vehicle. Each arm may be provided with a housing 46 for retaining the compression spring 44 in a proper location. It is also important to note that when the arms 34 are in their forward flush positions with the vehicle 20 that the drum 30 provides a protective cover for the vehicle steering shroud 28. The deployment apparatus 22 can then provide the function of protecting the vehicle steering shroud 28 during transportation and movements of the vehicle prior to its deployment from the submarine. Another important aspect to note about the deployment apparatus is that each arm 34 is provided with a lug 48 which extends from the arm in a direction opposite of the arm from its pivotal connection 36. This lug provides a double function, namely (1) engaging the aft end of the steering shroud 28 when the arms 34 open up so as to ensure movement of the drum 30 off of the steering shroud and (2) engaging an inside portion 50 of the drum 30 for establishing a stop to the swinging movement of the arm at a preselected aft position, as illustrated in FIG. 4.

Figure 5:
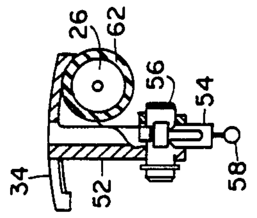
FIG. 5 is a cross-sectional view taken along plane V—V of FIG. 2.

As illustrated in FIGS. 2, 3, and 5 the hydrophone deployment apparatus is provided with means for enabling retention and selective releasing of the arms from the forward flush positions with the vehicle. The means for enabling this retention and selective releasing may include each arm having an inwardly extending flange 52, each flange having a recess for receiving a link 54 which is pivotally connected within the recess by a pin 56. Each link 54 may be provided with a bottom knob 58 which may be tightly engaged within or released from a releasing mechanism 60 within the vehicle. The releasing mechanism 60 is shown in details in FIGS. 10 and 11 and will be described fully hereinbelow.

The hydrophone 26 is releasably mounted on the inside of one of the arms, as illustrated in FIGS. 2 and 5. The releasable mounting may include a sheath 62 of resilient material which is bonded by any suitable means to an inside location of the arm. The sheath 62 is configured so as to snugly engage the hydrophone, but loosely enough to allow the hydrophone to be withdrawn therefrom at the time of final deployment.

The cable 24 is connected between the hydrophone 26 and the vehicle 20, as illustrated in FIG. 2. A connector 64 may be provided for making a pressure tight connection between the cable and internal circuitry (not shown) of the vehicle which is associated with the hydrophone 26. The intermediate portion of the cable between the vehicle 20 and the hydrophone 26 is wound on the drum 30, as illustrated in FIG. 2. The cable is shown wound on the drum 30 in a single layer, however, if desired multiple wound layers may be utilized. This wound arrangement of the cable on the drum enables deployment of the cable in a paid out condition behind the vehicle without any entanglement thereof.

Figure 9:
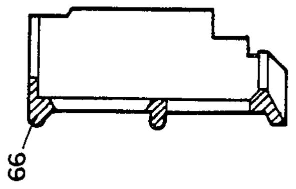
FIG. 9 is a cross-sectional view taken along plane IX—IX of FIG. 8.
Figure 7:
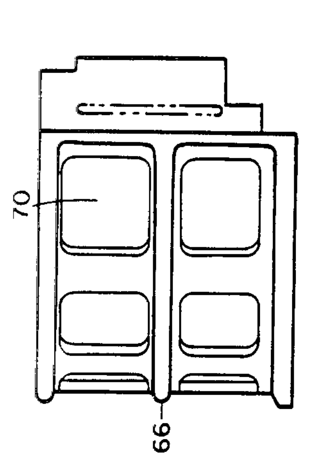
FIG. 7 is a plan view of one of the segments of a cover for the hydrophone deployment apparatus.
Figure 8:
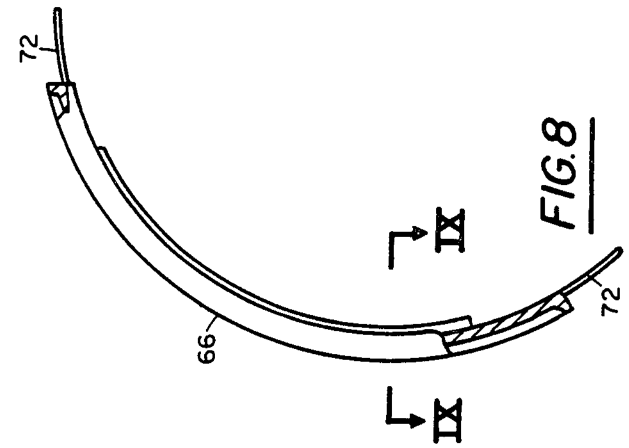
FIG. 8 is a view taken along plane VIII—VIII of FIG. 7.
Figure 13:
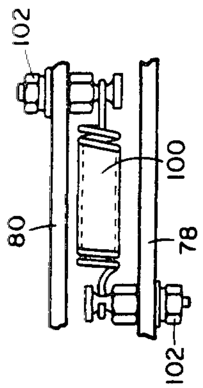
FIG. 13 is a view taken along plane XIII—XIII of FIG. 10.
Figure 12:
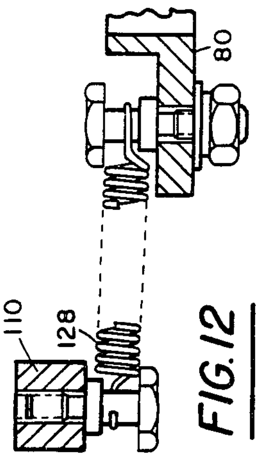
FIG. 12 is a cross-sectional view taken along plane XII—XII of FIG. 10.

As illustrated in FIG. 2, the preferred embodiment of the hydrophone deployment apparatus may include a cover 66 which is mounted about the drum 30 and spaced therefrom to provide a cavity 68 for the winding of the cable 24 on the drum. The cover 66 is longitudinally segmented, one of the segments 66 being shown in detail in FIGS. 7, 8, and 9. When three arms 34 are employed, as illustrated in the present embodiment, the cover 66 is divided into three segments with each segment spanning the arcuate distance between successive arms. As illustrated in FIG. 7, each segment is provided with vent holes 70 to prevent build up of water flow forces and pressure on the cover segments 66 during high speed launching of the vehicle. Visual inspection of the wound condition of the cable 24 on the drum 30 is also provided. As illustrated in FIG. 8, each segment 66 may be provided with a flange 72 at each respective end which is located inwardly from the outer peripheral extension of the segment. With this arrangement each arm can be folded in its forward position, as illustrated in FIG. 2, over the top of adjoining flanges 72 of successive segments 66 so that when all of the arms are in their forward positions, as illustrated in FIG. 2, the segments of the cover are maintained in a mounted condition on the drum 30. On the other hand, when the arms 34 are moved to their aft positions, as illustrated in FIG. 3, the arms no longer engage the flanges 72 and the segments 66 of the cover are allowed to fall away from the drum.

In order to assure that the hydrophone deployment apparatus does not slide off of the vehicle after the vehicle is underway a pin 74, as illustrated in FIG. 2, may extend into the tail portion of the vehicle and into each arm respectively. With this arrangement the pins will retain longitudinal position of the deployment apparatus 22 on the vehicle when the arms 34 are in their forward positions, as illustrated in FIG. 2, and will release the apparatus from the longitudinal retention when the arms are moved from the forward positions. Additional longitudinal positioning may be maintained by spring clips 76 (only one being shown in FIG. 2) which extend over forward edges of the steering shroud 28 and extend aft in engagement with an inner surface of the drum 30. When the arms 34 are first opened the drag on the arms will cause the spring clips 76 to ride over the steering shroud 28 to release the drum 30 from the steering shroud.

Figure 11:
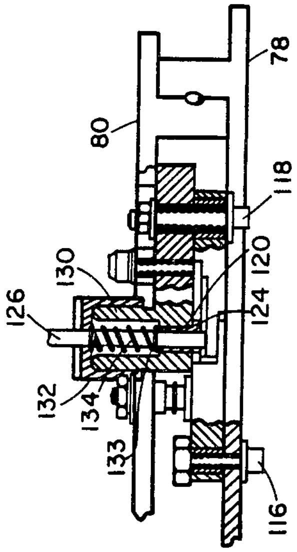
FIG. 11 is a view taken along plane XI—XI of FIG. 10.

The retention and releasing means of the deployment apparatus 22 from the vehicle 20, referred to hereinabove, is shown in detail in FIGS. 2, 5, and 10 through 13. The retention and releasing means includes the links 54 with their respective knobs 58, one of which is illustrated in FIG. 5. As illustrated in the other figures the retention and releasing means includes a pair of plates 78 and 80, each plate having a respective central aperture 82 and 84 for rotatable mounting on a shaft 86 (see FIG. 2) with the plates in a spaced relationship with respect to one another, as illustrated in FIG. 11. The shaft 86 is mounted inside the torpedo, the particular mounting not being shown since it is not part of the present invention.

Each plate has a plurality of arms 88 and 90 respectively in the plane of the respective plate, and each arm has a transverse flange 92 and 94 respectively which extends into the spacing between the plates. With this arrangement pairs of flanges, made up of a flange from each respective arm, are capable of opening and closing with respect to one another as the plates are rotated in opposite directions on the shaft 86.

Figure 10:
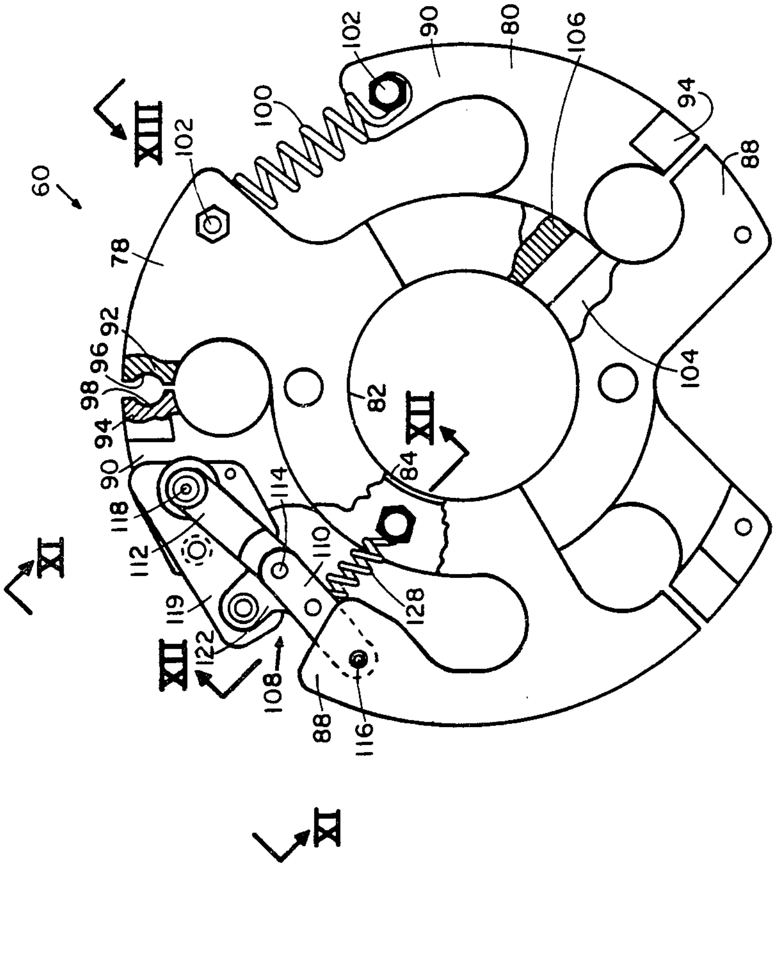
FIG. 10 is a side view of a releasing mechanism for the hydrophone deployment apparatus with portions cut away to show various details thereof.

As best seen from the top of FIG. 10, each flange 92 and 94 has a respective recess 96 and 98 so that each pair of flanges provides a socket for retaining or releasing the knob 58 on a respective link 54 (see FIG. 5).

Spring means, such as a tension spring 100, interconnects the plates 78 and 80 for biasing the pairs of flanges to an open releasing position. The spring 100 may be retained to the plates by bolt and nut combinations 102. Means, such as lugs 104 and 106, may be mounted to the plates in the spacing between the plates and spaced a predetermined distance from one another, as illustrated in FIG. 10, for stopping the pairs of flanges 92 and 94 at a predetermined open position. Further, means, generally indicated at 108, are provided for locking and unlocking the pairs of flanges from the closed positions, as illustrated in FIG. 10, to the open positions.

The locking and unlocking means 108, referred to in the preceeding paragraph, include a pair of pivoted lever arms 110 and 112 which are innerconnected between the plates 78 and 80 respectively, the arms being pivoted with respect to one another at 114 and pivoted to the respective plates at 116 and 118 respectively. In the preferred embodiment an extension plate 119 is mounted on the inside of the plate 80 between the lever arms and the plate, and is provided with an aperture 120 (see FIG. 11). One of the lever arms, such as lever arm 110, may have an appendage 122 which is provided with an aperture 124 which can be aligned with the aperture 120 in the plate extension for receiving a pin 126 therethrough to lock the pairs of flanges in a closed position against the knobs 58. Spring means, such as a tension spring 128, is interconnected between the lever arm 110 and the plate 80 for biasing the pairs of flanges to open positions when the pin 126 is pulled from the arm and plate apertures 120 and 124 respectively. As illustrated in FIG. 10, it is desirable that the lever arms 110 and 112 be only slightly off an axis between their pivot points 116 and 118, such as $3\frac{1}{2}°$, so as to take the majority of the force of the spring 100, and thereby relieve the force that would normally be applied to the pin 126 within the apertures 120 and 124. With this arrangement the pin 126 can be easily pulled from these apertures to allow the pairs of flanges to open and release the knobs 58 on the arms 34 of the deployment apparatus.

The pin 126 may be connected to a longitudinal solenoid (not shown) within the vehicle which, in turn, is actuated by an electrical means that pulls the pin at a predetermined time after launching the vehicle from the submarine. As illustrated in FIG. 11, the plate extension 119 may be provided with an outwardly extending threaded boss 130 for threadably receiving a housing 132. A retainer ring 133 may be provided about the pin 126 within the housing, and a compression spring 134 may be mounted between the retainer 133 and an opposite end of the housing for biasing the pin 126 toward the aperture 124 within the lever arm 110. With this arrangement, the pin 126 is maintained within the aperture 124 within the lever arm 110 until the pin 126 is retracted by the longitudinal solenoid, referred to hereinabove.

It is now readily apparent that the hydrophone deployment apparatus described hereinabove will perform the desired function, as illustrated in FIG. 1. In the preferred embodiment the hydrophone deployment apparatus is neutrally buoyant so that when the torpedo swims away from the apparatus it will maintain a substantially constant depth level in the water until the assembly is jettisoned, as illustrated in FIG. 1. At this time the hydrophone 26 is payed out a predetermined distance behind the vehicle 20 by the cable 24 and is substantially in line therewith.

Obviously, many modifications and variations of the present invention are possible in the light of the above teachings, and, it is therefore to be understood that within the scope of the disclosed inventive concept, the invention may be practiced otherwise than as specifically described.

What is claimed is:

1. A retention and releasing apparatus comprising:
a link having a knob mounted on one end thereof;
a pair of plates, each plate having a central aperture for rotatable mounting on a shaft with the plates in a spaced relationship with respect to one another;
each plate having a plurality of arms in the plane of the plate, and each arm having a transverse flange which extends into the spacing between the plates so that pairs of flanges, made up of a flange from each respective arm, are capable of opening and closing with respect to one another as the plates are rotated in opposite directions on the shaft;
each flange having a recess so that each pair of flanges provides a socket for retaining or releasing the knob on a respective link;
spring means interconnecting the plates for biasing the pairs of flanges to an open releasing position;
means mounted to the plates for stopping the pairs of flanges at a predetermined open position and
means for locking and unlocking the pairs of flanges from the closed positions to the open positions.

2. An apparatus as claimed in claim 1 wherein the locking and unlocking means includes:
a pair of pivoted lever arms interconnected between the pair of plates;
one of the lever arms and one of the plates each having an aperture so that the apertures can be aligned to receive a pin for locking the pairs of flanges in a closed position against the knobs; and
spring means interconnected between one of the lever arms and one of the plates for biasing the pairs of flanges to open positions when the pin is pulled from the arm and plate apertures.

* * * * *